United States Patent [19]
Cramer

[11] Patent Number: 5,842,870
[45] Date of Patent: Dec. 1, 1998

[54] STUFFED TOY AND METHOD FOR EDUCATING CHILDREN WITH DIABETES

[76] Inventor: Carol P. Cramer, 225 Pebble Creek Dr., Lake Zurich, Ill. 60047

[21] Appl. No.: 866,333

[22] Filed: May 30, 1997

[51] Int. Cl.[6] .................................................. G09B 23/28
[52] U.S. Cl. ........................ 434/267; 434/262; 446/296; 446/472
[58] Field of Search .................................... 434/236, 262, 434/267; 446/296, 472, 295

[56] References Cited

U.S. PATENT DOCUMENTS

| | | | |
|---|---|---|---|
| 4,349,338 | 9/1982 | Heppler | 434/262 |
| 4,439,162 | 3/1984 | Blaine | 434/273 X |
| 4,585,424 | 4/1986 | DeMars | 446/295 |
| 4,759,718 | 7/1988 | Nobuta | 434/262 |
| 4,822,285 | 4/1989 | Summerville | 434/272 |
| 4,917,607 | 4/1990 | Van Hoose | 434/236 |
| 5,314,339 | 5/1994 | Aponte | 434/267 |
| 5,411,437 | 5/1995 | Weber et al. | 434/267 X |

*Primary Examiner*—Jeffrey A. Smith
*Attorney, Agent, or Firm*—Meroni & Meroni

[57] ABSTRACT

A stuffed toy animal is provided for educational interaction with a child learning about medication injection sites. The stuffed toy includes a body having a head, torso, arms, and legs. A plurality of injection regions are disposed at various locations of the body. The injection regions are distinguishable from one another to assist in the child's distinguishable identification of the injection regions. A method is also provided to use the stuffed toy in a game-like manner to assist in the overall educational process.

23 Claims, 3 Drawing Sheets

STUFFED TOY AND METHOD FOR EDUCATING CHILDREN WITH DIABETES

BACKGROUND OF THE INVENTION

1. Field of the Invention

The present invention relates generally to educational toys and devices. More particularly, the invention pertains to a stuffed toy animal for educating children with diabetes.

2. Description of the Prior Art

Diabetes is a disease in which the human body does not produce or properly use insulin. While there is presently no cure for diabetes, it can be controlled and managed. When a child is afflicted with diabetes, this control and management can be more difficult. Treatment for any child with diabetes involves keeping the blood-sugar levels as close to normal as possible. Proper management of diabetes for children includes taking insulin by injection.

Children usually take between one and three injections daily. Children are usually able to correctly measure, mix, and administer their insulin injections by age 12. Children younger than 12 years old may also be able to inject themselves with insulin provided their dosages are verified by an adult.

Teaching children the proper procedures for administering injections can be difficult. For example, the child with diabetes must learn all of the possible injection sites or regions on the human body. Further, it is important that the child learns that each of these sites get rotated with every injection. If a child with diabetes were to administer his or her shots at the same injection site with every injection, scar tissue would build up at that site and would result in that particular site becoming less and less affective in allowing the injected insulin to travel into the blood stream. Ultimately, this would allow the blood-sugars in the body to escalate into dangerously high numbers and increase the risk of serious life threatening complications.

As will be described in greater detail hereinafter, the stuffed toy of the present invention solves the aforementioned problems and is specially designed to assist children in learning about diabetes, as well as being adapted to comfort the child during difficult times.

SUMMARY OF THE INVENTION

Accordingly, it is an object of this invention to provide a stuffed toy for educating children with diabetes.

Another object of this invention is to provide a stuffed toy having injection sites or regions disposed at all of the proper locations for administering insulin injections. Each injection region is distinguishable from one another to assist in the child's learning process.

Still another object of this invention is to provide a stuffed toy formed of soft, flexible covering and filled with soft stuffing, so that while the stuffed toy is used for educational purposes, the stuffed toy is adapted to attract the affections of the child, and is well suited for the child to cuddle with or sleep with in bed.

Yet another object of this invention is to provide a stuffed toy which is inexpensive to manufacture so that it may be made readily available at a low cost to all children with diabetes.

To achieve the foregoing and other objectives, and in accordance with the purposes of the present invention a stuffed toy is provided for educational interaction with a child learning about medication injection sites. The stuffed toy includes a body having a head, torso, arms, and legs. A plurality of injection regions are disposed at various locations of the body. The injection regions are distinguishable from one another to assist in the child's distinguishable identification of the injection regions.

In accordance with an aspect of the invention, the outer surface of the body is formed of a soft, flexible covering in the form of a stuffed animal and has a soft, flexible stuffing filled therewithin.

In accordance with another aspect of the invention, a pair of blood-check-indicator regions are disposed on opposite sides of the end portions of each of the arms.

In accordance with a method of the invention, a method is disclosed for learning about medication injection sites. The method includes the steps of: providing a body of a stuffed toy having a head, torso, arms, and legs; providing a plurality of injection regions disposed at various locations of the body; determining if the stuffed toy is in need of medication; selecting an appropriate injection region by selectably rotating injection regions from previous selections and differentiating between injection regions where each injection region is colored with a distinguishable color from one another; and administering the medication with a syringe to the selected injection region.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
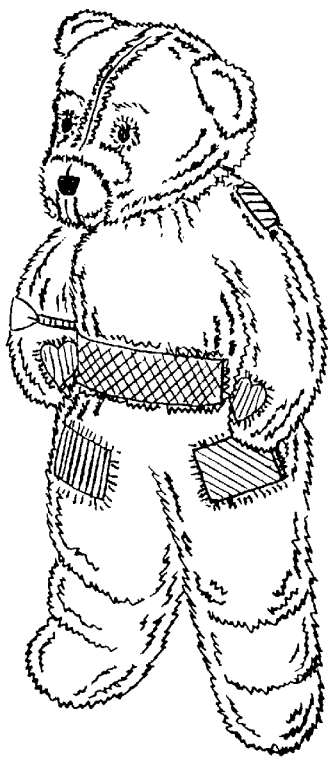
FIG. 1 is a perspective view of the present invention.
Figure 2:
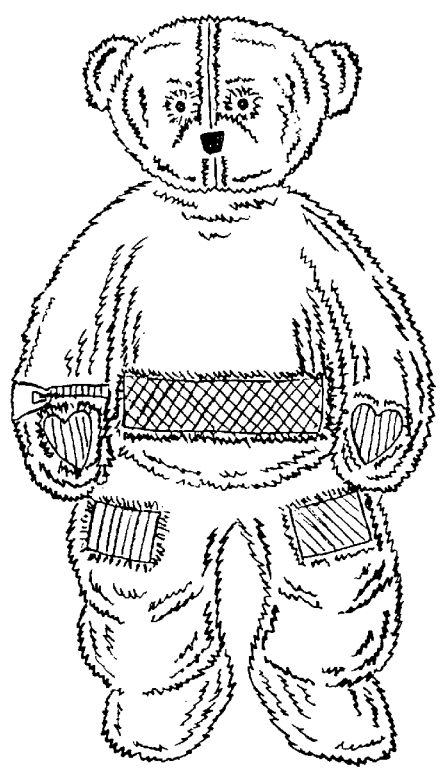
FIG. 2 is a front view of the present invention.
Figure 3:
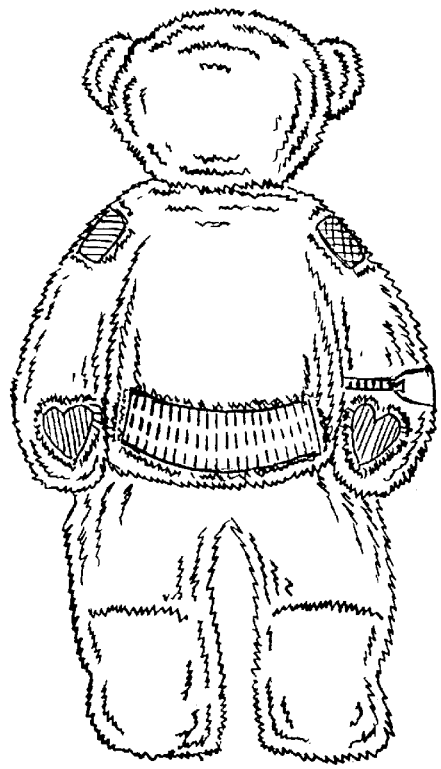
FIG. 3 is a back view of the present invention.
Figure 4:
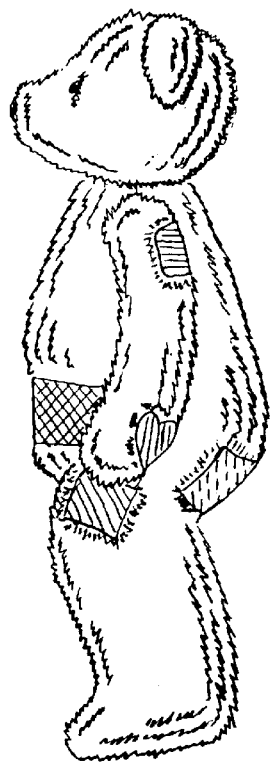
FIG. 4 is a left side view of the present invention.
Figure 5:
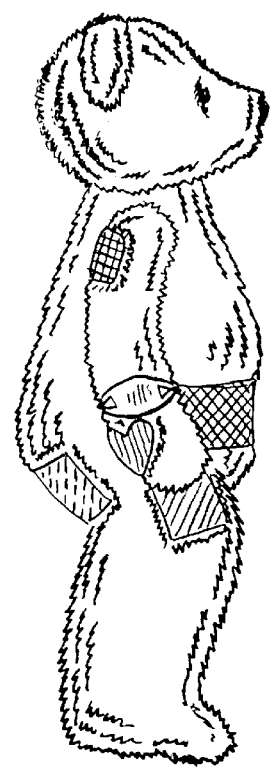
FIG. 5 is a right side view of the present invention.
Figure 6:
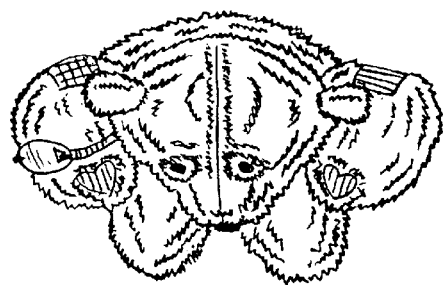
FIG. 6 is a top view of the present invention.

Referring now to the drawings, a stuffed toy 10 for educational interaction with a child learning about medication injection sites is illustrated in FIG. 1.

Figure 10:
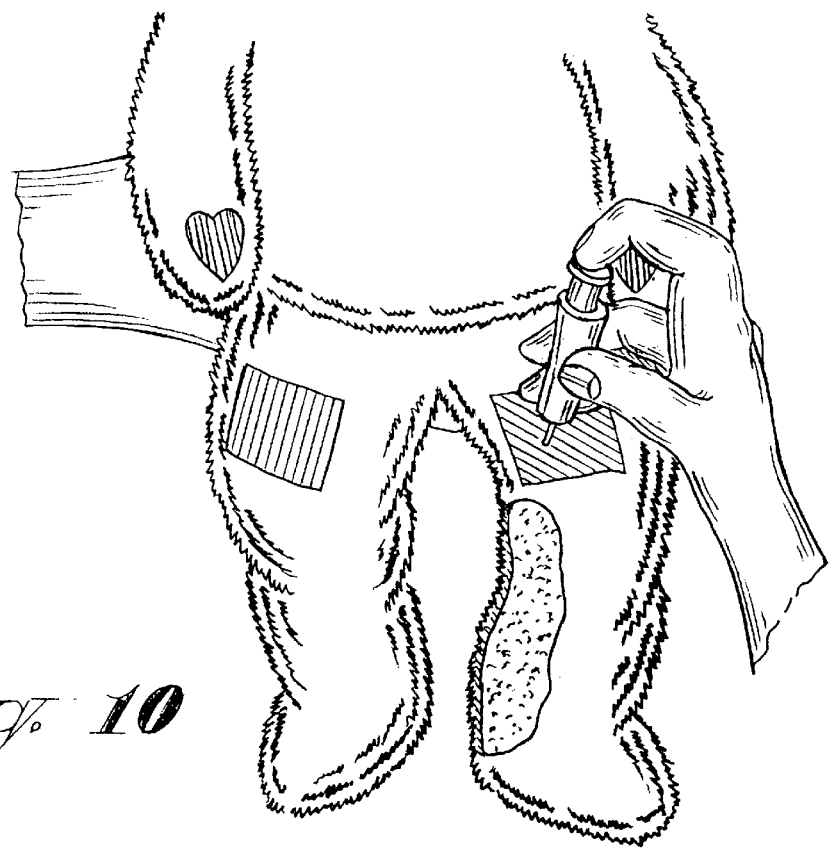
FIG. 10 is an enlarged perspective view of a stuffed toy of the present invention having an injection administered with partial cut away illustrating stuffing filled therein.

The stuffed toy 10 includes a body 12 having a head 14, torso 16, arms 18, and legs 20. The outer surface 22 of the body 12 is formed of a soft and fur-like flexible covering 24 and has a soft, flexible stuffing 26 (FIG. 10), such as cotton or sponge, filled therewithin. The stuffed toy 10 is adapted to attract the affections of a child, and is well suited for the child to cuddle with or sleep with in bed. In the preferred embodiment illustrated in FIG. 1, the body 12 is shaped to form a stuffed toy bear. However, it should be understood that other shapes or forms having a body as described could be employed.

Referring to FIGS. 2–6, a plurality of injection sites or regions 28 are disposed at varied locations of the body 12 corresponding to locations where injections of medication are administered on a human body. The injection regions 28 are distinguishable from one another to assist in the child's distinguishable identification of these regions 28.

Preferably, each injection region 28 is colored in varied colors distinguishable from one another. It is significant to note that young children are unable to correctly identify their right side from their left. However, colors can be easier for a child to learn. As previously stated, the child with diabetes must learn all of the possible injection sites or regions on the human body. Further, it is important that the child learns that each of these sites get rotated with every injection. If a child with diabetes were to administer his or her shots at the same injection site with every injection, scar tissue would build up at that site and would result in that particular site becoming less and less affective in allowing the injected insulin to travel into the blood stream. Ultimately, this would allow the blood-sugars in the body to escalate into dangerously high numbers and increase the risk of serious life threatening complications. Accordingly, the distinguishable regions 28 of the present invention provide a means for the child to learn this process.

In the preferred embodiment, each injection region 28 is formed of a fabric patch secured to the body 12. In the case where the present invention is used for children with diabetes, the injection regions include a pair of arm injection regions 30. Each arm injection region 30 is disposed at respective upper back portions 32 of the arms 18. A pair of leg injection regions 34 are provided. Each leg injection region 34 is disposed at respective upper front portions 36 of the legs 20. A stomach injection region 38 is disposed at a lower front portion 40 of the torso 16. A buttocks injection region 42 is disposed at a lower back portion 44 of the torso 16. It should be understood that the present invention can be readily adapted to provide different region locations relating to other diseases.

Each arm 18 has a pair of blood-check-indicator regions 46 disposed on opposite sides 48 of end portions 50 of each of the arms 18. Preferably, each blood-check-indicator region 46 is heart-shaped and colored red. The blood-check-indicator regions 46 resemble where the child's fingers get pricked a minimum of five times a day to monitor a diabetics blood-sugar levels. This procedure is of utmost importance in the child's education of diabetes as it is crucial for a diabetic to maintain good control of their blood-sugars to as close as normal as possible to prevent the onset of diabetic complications. One of the serious complications of diabetes is blindness, therefore finger prinks used to take test blood samples should be taken on the sides of the fingers in order to keep the pads of the fingers callus free and sensitive to reading Braille if the need should arise. Accordingly, the blood-check-indicator regions 46 are provided as above described to assist in teaching the child with diabetes this important process.

A medical alert bracelet 52 is secured to a lower portion 54 of one of the arms 18. The bracelet 52, such as the MedicAlert™ bracelet provided by the Medic Alert Foundation, teaches the child the importance of wearing such a bracelet that contains important life saving information about an individual in that can be retrieved by others in the event the child were involved in an accident.

In accordance with a method of the present invention, a method of learning about medication injection sites is provided in a game-like manner that is well suited for teaching children. The method includes the steps of providing a body of a stuffed toy having a head, torso, arms, and legs; providing a plurality of injection regions disposed at various locations of the body; determining if the stuffed toy is in need of medication; selecting an appropriate injection region; and administering the medication with a syringe to the selected injection region.

The step of selecting an appropriate injection region 28 includes selectably rotating injection regions from previous selections and differentiating between injection regions where each injection region is colored with a distinguishable color from one another. This step may be carried in several different manners as desired. For example, the adult or teacher may question the child about which region was administered last on the stuffed toy 10 and then which region 28 may be administered next, where the child is thereby able to associate the regions 28 by color. The child's process of carrying out these steps may then also correspond to the child's own receiving of medication.

Figure 9:
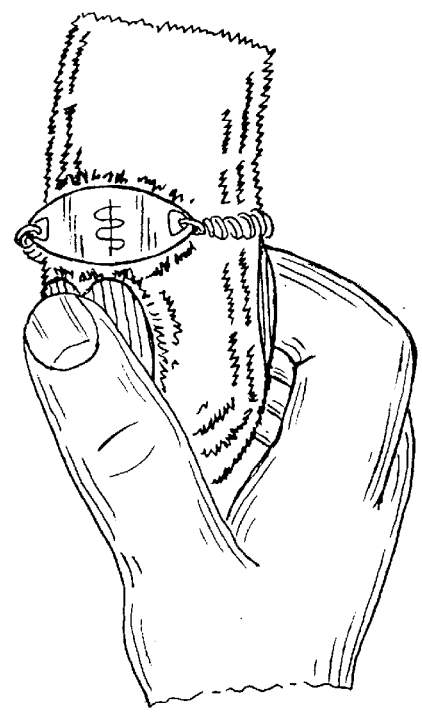
FIG. 9 is an enlarged perspective view of one arm of the present invention.

The step of determining if the stuffed toy is in need of medication includes the step of locating or grasping the blood-check-indicator regions 28 provided on the end portions of the arms, as illustrated in FIG. 9. This step corresponds the child's real step of conducting a finger prick test, testing the blood-sugar level of the blood sample received from the finger prick with a test kit or device, and determining a dosage of insulin based upon the test results, if needed. For this step in the present invention, the child or adult may simply calculate the dosage and necessity by imagination.

Figure 7:
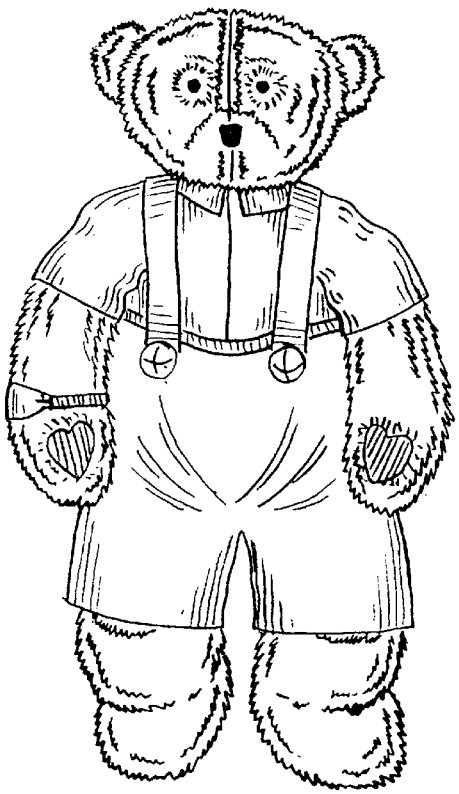
FIG. 7 is a front view of the present invention having clothes.
Figure 8:
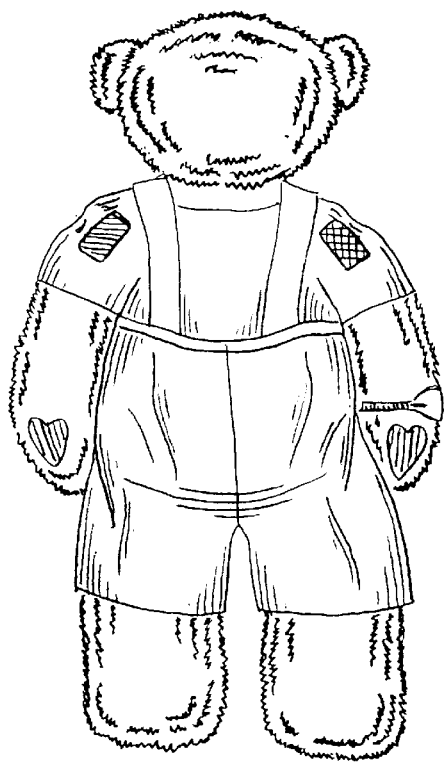
FIG. 8 is a back view of the present invention having clothes.

The step of administering the medication may further include the steps of undressing the stuffed toy to expose the selected injection region 28 and dressing the stuffed toy after administering the medication. The undressed stuffed toy is illustrated in FIGS. 1–6, where the stuffed toy is shown with clothes 56 in FIGS. 7–8 which conceal several regions. In administering the medication, a syringe 58 with or without an attached hypodermic needle 60, as desired, may be used to teach the child proper handling and procedure. For younger children, the child may simply pretend that he or she is administering the injection with a real syringe or the adult may pretend to administer the injection to illustrate that the stuffed toy is brave and is able to cope with this procedure, thus allowing the child to gain confidence.

A further step of locating the medical alert bracelet secured to the stuffed toy can be implemented to illustrate to the child the necessity of wearing this bracelet and how the stuffed toy has the confidence to wear this bracelet.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:
1. A stuffed toy for educational interaction with a child learning about medication injection sites, the stuffed toy comprising:
   (a) a body having a head, torso, arms, and legs, the outer surface of the body being formed of a soft, flexible covering and having a soft, flexible stuffing filled therewithin;
   (b) a plurality of injection regions disposed at varied locations of the body, the injection regions being distinguishable from one another to assist in the child's distinguishable identification of the injection regions, the injection regions including: a pair of arm injection regions, each arm injection region being disposed at respective upper back portions of the arms, a pair of leg injection regions, each leg injection region being disposed at respective upper front portions of the legs, a stomach injection region disposed at a lower front portion of the torso, and a buttocks injection region disposed at a lower back portion of the torso; and (c) a blood-check-indicator region disposed at an end portion of each of the arms.

2. The stuffed toy of claim 1, wherein each injection region is provided with a distinct color or color pattern such that each injection region is uniquely identified and easily distinguished from the other injection regions.

3. The stuffed toy of claim 2, wherein each injection region is formed of a fabric patch secured to the body.

4. The stuffed toy of claim 2, wherein the body is shaped to form a stuffed toy bear.

5. The stuffed toy of claim 1, wherein each arm has a pair of blood-check-indicator regions disposed on opposite sides of the end portions of each of the arms.

6. The stuffed toy of claim 5, wherein each blood-check-indicator region is heart-shaped and colored red.

7. The stuffed toy of claim 1, further comprising a medical alert bracelet secured to a lower portion of one of the arms.

8. A stuffed toy for educational interaction with a child learning about medication injection sites, the stuffed toy comprising:

(a) a body having a head, torso, arms, and legs; and (b) a plurality of injection regions disposed at varied locations of the body, the injection regions being distinguishable from one another to assist in the child's distinguishable identification of the injection regions.

9. The stuffed toy of claim 8, wherein the outer surface of the body is formed of a soft, flexible covering and has a soft, flexible stuffing filled therewithin.

10. The stuffed toy of claim 9, wherein the body is shaped to form a stuffed toy bear.

11. The stuffed toy of claim 8, wherein each injection region is provided with a distinct color or color pattern such that each injection region is uniquely identified and easily distinguished from the other injection regions.

12. The stuffed toy of claim 11 wherein each injection region is formed of a fabric patch secured to the body.

13. The stuffed toy of claim 11, wherein each arm has a pair of blood-check-indicator regions disposed on opposite sides of an end portion of the arm.

14. The stuffed toy of claim 13, herein each blood-check-indicator region is heart-shaped and colored red.

15. The stuffed toy of claim 8, wherein the injection regions include a pair of arm injection regions, each arm injection region being disposed at respective upper back portions of the arms, a pair of leg injection regions, each leg injection region being disposed at respective upper front portions of the legs, a stomach injection region disposed at a lower front portion of the torso, and a buttocks injection region disposed at a lower back portion of the torso.

16. The stuffed toy of claim 8, wherein each arm has a blood-check-indicator region disposed at an end portion of the arm.

17. The stuffed toy of claim 8, further comprising a medical alert bracelet secured to a lower portion of one of the arms.

18. A method of learning about medication injection sites comprising the steps of:

(a) providing a body of a stuffed toy having a head, torso, arms, and legs;

(b) providing a plurality of injection regions disposed at various locations of the body;

(c) determining if the stuffed toy is in need of medication;

(d) selecting an appropriate injection region; and (e) administering the medication with a syringe to the selected injection region.

19. A stuffed toy for education interaction with a child learning about medication injection sites, the stuffed toy comprising:

(a) a body having a head, torso, arms, and legs, the outer surface of the body being formed of a soft, flexible covering and having a soft, flexible stuffing filled therewithin;

(b) a plurality of injection regions disposed at varied locations of the body, the injection regions being distinguishable from one another by means of using a different color in each region to assist in the child's identification of the injection regions, the injection regions including: a pair of arm injection regions, each arm injection region being disposed at respective upper back portions of the arms, a pair of leg injection regions, each leg injection region being disposed at upper front portions of the legs, a stomach injection region disposed at a lower front portion of the torso, and a buttocks region disposed at a lower back portion of the torso; and (c) a blood check indicator region, easily distinguishable from said injection regions, disposed at an end portion of each of the arms.

20. A method of learning about medication injection sites comprising the steps of:

(a) providing a body of a stuffed toy having a head, torso, arms, and legs;

(b) providing a plurality of injection regions disposed at various locations of the body;

(c) determining if the stuffed toy is in need of medication;

(d) selecting an appropriate injection region by selectively rotating injection regions from previous selections and differentiating between injection regions where each injection region is colored with a distinguishable color from one another;

(e) administering the medication with a syringe to the selected injection region.

21. The method of claim 20, wherein the step of determining if the stuffed toy is in need of medication includes the step of locating blood-check-indicator regions provided on end portions of the arms.

22. The method of claim 21, further comprising the step of locating a medical alert bracelet secured on one of the arms of the stuffed toy.

23. The method of claim 22, wherein the step of administering the medication includes the steps of undressing the stuffed toy to expose the selected injection region and dressing the staffed toy after administering the medication.

* * * * *